Feb. 1, 1966    L. E. JOHNSON    3,232,554
FISHING REEL WITH CLUTCH AND BRAKE
Original Filed June 23, 1961    3 Sheets-Sheet 1
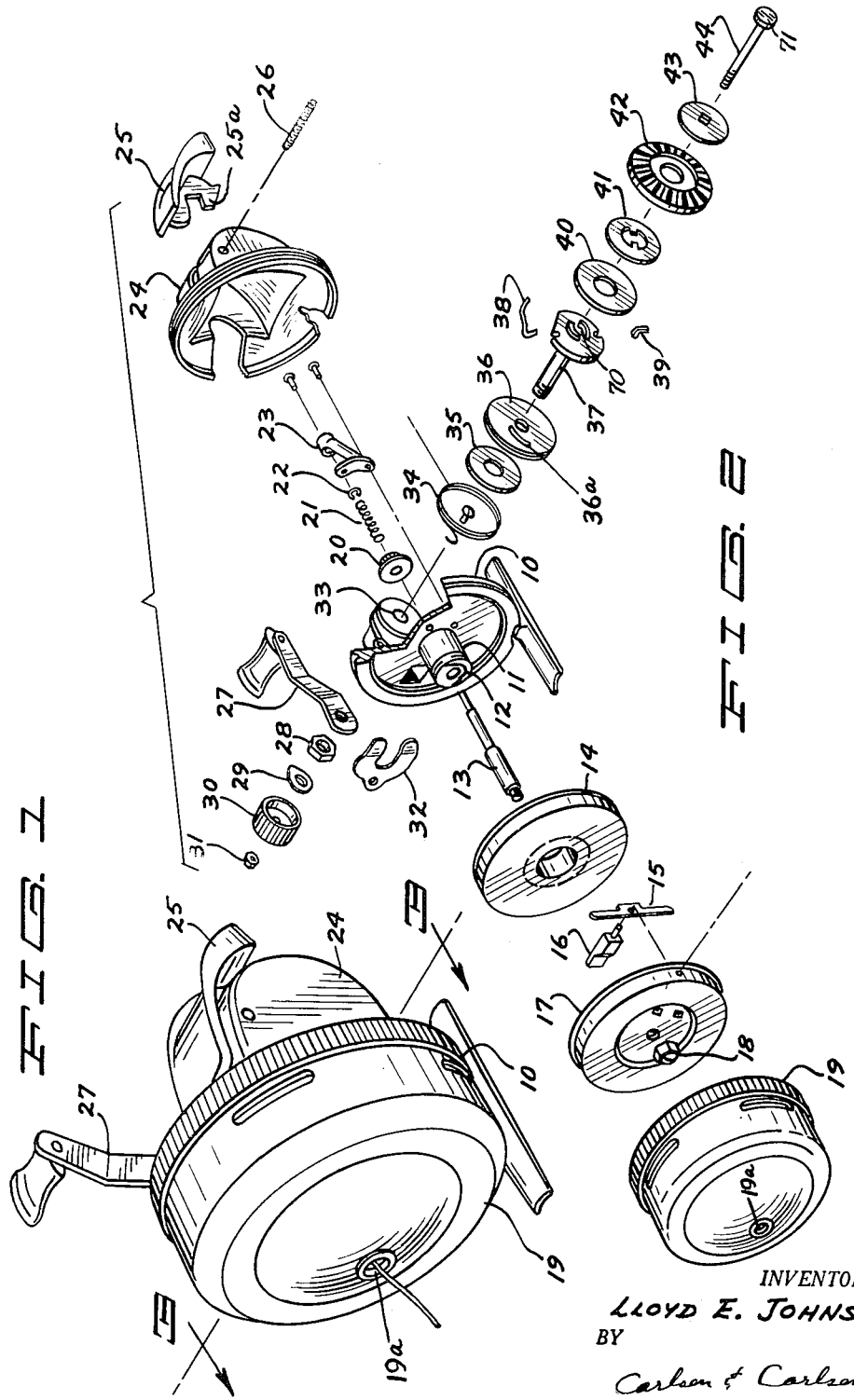
INVENTOR.
LLOYD E. JOHNSON
BY
Carlson & Carlson
ATTORNEYS

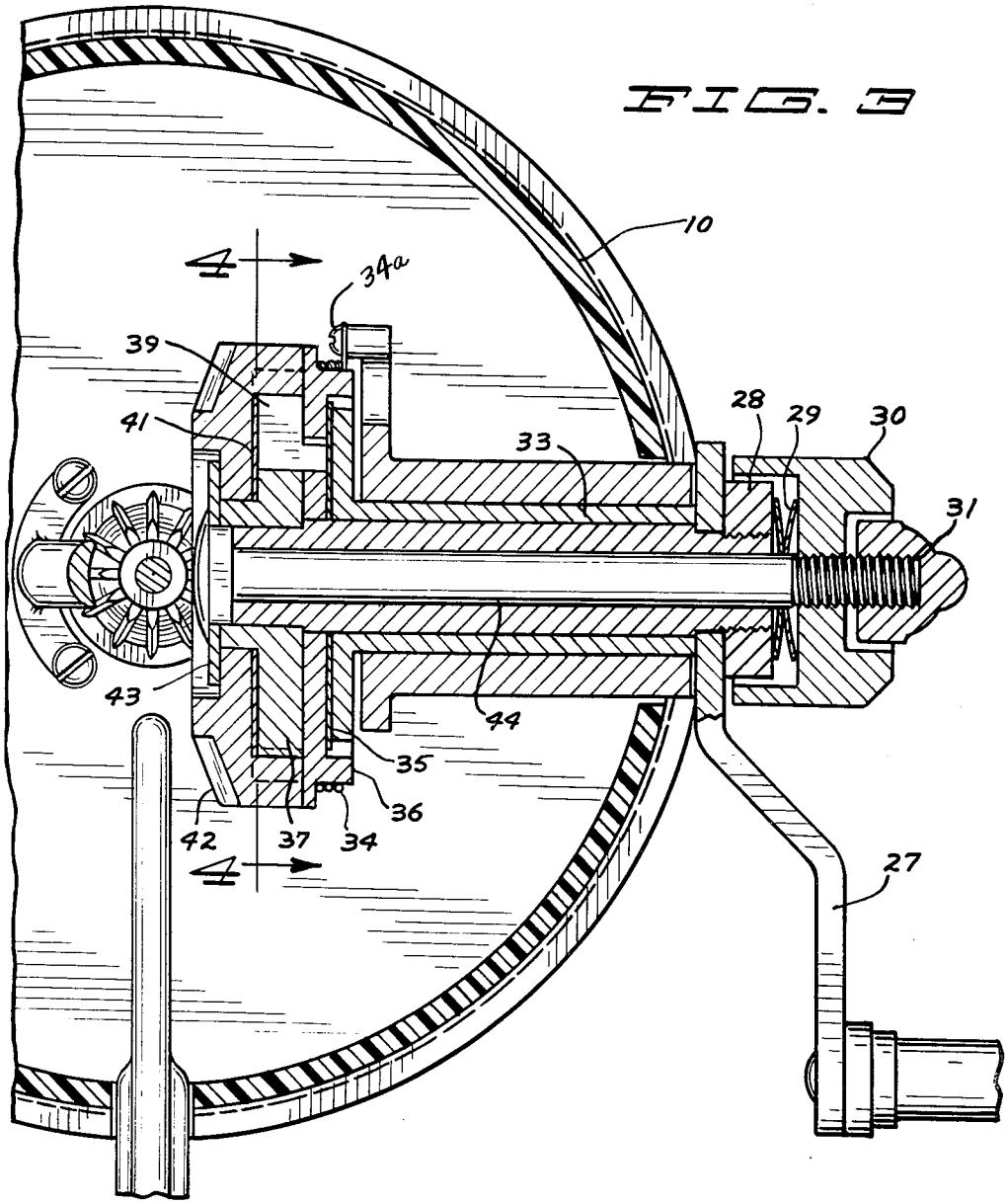

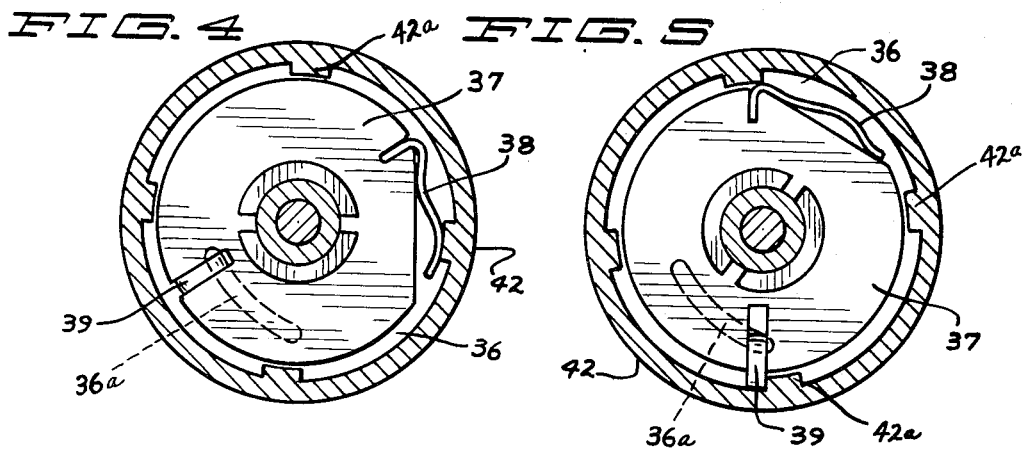

United States Patent Office 3,232,554
Patented Feb. 1, 1966

3,232,554
FISHING REEL WITH CLUTCH AND BRAKE
Lloyd E. Johnson, Mankato, Minn., assignor to Denison-Johnson, Inc., Mankato, Minn., a corporation of Minnesota
Original application June 23, 1961, Ser. No. 119,181, now Patent No. 3,139,241, dated June 30, 1964. Divided and this application Oct. 31, 1963, Ser. No. 327,570
4 Claims. (Cl. 242—84.46)

This is a division of application Serial No. 119,181, filed June 23, 1961, and now Patent No. 3,139,241.

This invention relates generally to fishing reels and is more particularly directed to apparatus for improving the line handling characteristics in so-called spinning reels in which the line is carried on a normally fixed or non-rotatable spool.

In the prior art, considerable effort has been directed toward various forms of control devices for reeling in and playing out line from a fishing reel. In one form of construction, a crank handle is connected through appropirate gearing to a line spool which is driven through an adjustable clutch. In this arrangement, the clutch may take the form of a variable drag element in which pressure, in one form or another, may be adjusted to provide slippage of the clutch to play out line when the tension on the line exceeds a predetermined value regardless of the pressure exerted upon the drive train through the crank handle.

Another form in use provides a direct connection from the crank handle to the rotor or winding member for the line spool and an ancillary, or auxiliary braking mechanism in which the entire drive train is operable when playing out or reeling in a fishing line and the brake element is adjustable to provide friction on one of the elements of the drive train to operate as a drag.

In the present invention, a new useful construction is provided in which a direct driving connection to the rotor or spooling member for the line spool, through appropriate gearing means, is provided for reeling in a line and, at the option of the operator, line may be played out under control of an integrally mounted drag means.

It is therefore an object of the present invention to provide a new and improved drive and drag mechanism for use in a fishing reel of the spinning type.

It is a further object of the present invention to provide such a mechanism which is operative to provide a direct connection to a line spooling member upon rotation in one direction and to provide a frictional connection to the spooling member upon rotation in the opposite direction.

It is a still further object of the present invention to provide apparatus which will automatically shift from a first mode of operation to a second mode of operation upon a reverse in the direction of operation, or rotation, of the operating handle of a fishing reel.

It is a still further object of the present invention to provide new and useful apparatus and mechanism for use in a fishing reel that may be constructed of efficient and economically produced components.

These and other more detailed and specific objects will be disclosed in the course of the following specification, reference being had to the accompanying drawings, in which FIG. 1 is a perspective drawing of a fishing reel in which the principles of my invention may be utilized.

FIG. 2 is an exploded perspective assembly drawing of the fishing reel shown in FIG. 1, on a reduced scale.

FIG. 3 is an enlarged sectional drawing of the reel taken along section line 3—3 in FIG. 1.

FIG. 4 and FIG. 5 are reduced sectional elevations taken along section line 4—4 on FIG. 3, illustrating two different operating positions of a drive mechanism employed in the reel.

Referring now to the drawings, in which like elements are provided with reference numerals, FIG. 1 shows a spin casting reel including a frame 10 upon which are mounted a front cover 19 having a center line opening 19a, and a rear cover 24. The usual control lever 25 and a crank handle 27 are also shown.

As shown in FIG. 2, the rear cover member 24 carries the thumb piece or control lever 25 mounted for rotation about a pivot pin 26 secured in the cover member. The frame 10 includes a plate portion having a forwardly extending tubular bearing member 11 having a cam surface 12 at its forward end and a bearing member 33 positioned on the rear face of the plate with a bore extending at right angles to the axis of the tubular bearing member 11. A drag-drive or shifting assembly is mounted on the bearing member 33. The assembly includes, reading generally from top left to lower right of FIG. 2, a drag lock nut 31, a drag adjustment knob 30, a drag washer 29, a crank nut 28, the crank handle 27, an anti-reverse spring 34, a thrust washer 35, an anti-reverse disc 36, a crank shaft 37, an L-shaped drive pawl 39, a click spring 38, a washer member 40, a keyed friction member 41, a bevel gear member 42, a drag washer 43 and a drag adjustment screw 44.

A drive shaft 13 is journaled for rotation in the tubular bearing member 11 and contains a threaded forward portion which is non-rotatably secured by nut 18 to a spooling member 17 and a non-circular rearwardly extending portion upon which is axially, slidably mounted a pinion gear 20. A spring 21 and retainer 22 therefor are adapted to hold pinion gear 20 upon the drive shaft. The drive shaft, when assembled, extends rearwardly through a bracket 23 mounted on the rear face of frame 10 and is engageable by a lug portion 25a of the control lever 25 extending inside of the rear cover. A line spool 14 is stationarily mounted upon the outside of tubular bearing member 11 and may be releasably fastened thereon by spring clip 32 fitting in notches in the bearing member. The spooling member 17 includes a radially slidable pick-up pin 16 which is spring biased to an inward retracted position by a leaf spring 15. This pick-up pin 16 is engageable with the cam surface 12 on the forward end of tubular bearing 11 for engagement therewith to extend the pick-up pin assembly into line engaging relationship. Reference may be had to the Denison et al. Patent, No. 2,828,088, dated March 25, 1958, entitled "Spinning Reel," for a detailed explanation of the operation of this portion of the apparatus.

In the embodiment shown in FIGS. 3, 4 and 5, crankshaft and drive disc 37 are journaled for rotation in tubular bearing member 33. The crank handle 27 is non-rotatably secured on the right hand end of the crankshaft and held thereon by suitable fastening means, such as nut 28. An anti-reverse disc 36, having a camming slot or surface 36a, formed therein, is rotatably mounted upon crankshaft 37 and it, with the washer member 35, is positioned between the left hand drive disc and bearing member 33. An anti-reverse spring 34 is positioned around the periphery of anti-reverse disc 36 and is fastened at one end to frame member 10 by suitable fastening means, shown as a screw 34a. The other end of anti-reverse spring 34 lies on the outside periphery of anti-reverse disc 36 and is free to move to provide the control action set forth below. It may be seen that the torsion spring arrangement of anti-reverse spring 34 tends to prevent reverse motion of anti-reverse disc 36 because motion in one direction tends to unwrap the coil spring from the outer periphery of member 36 and motion in a reverse direction tends toward tight frictional engagement. Output gear member 42, shown as a beveled gear having internally projecting lugs 42a positioned around the inside of a recess is also journaled for rotation upon crankshaft member 37 and is positioned on the left side of the drive disc portion and separated therefrom by washer member 41, which may be keyed to the crankshaft assembly. It may be noted that the driven end of the crankshaft is positioned within the recess in output member 42 so that the radially extendable L-shaped pawl 39 may engage the inwardly, radially extending lugs provided in the recess. A drag washer 43 is keyed to the left hand end of drag adjustment screw member 44 which extends through crankshaft 37 to the right hand end where it is engaged by a threaded drag adjustment member 30 which serves to adjust the tension upon the drag adjustment screw against the biasing effect of drag adjustment washer 29. A further threaded member 31 is provided to prevent inadvertent removal of drag adjustment member 30 and to tend to limit the range of operation thereof. The head 71 of drag adjusting member 44, is shaped to coact with the slot or key 70 formed on the end of crankshaft 37 to provide a non-rotatable connection therewith.

It may therefore be seen that relative rotational movement between anti-reverse member 36 and the crankshaft member 37 serves to extend and retract drive pawl 39 radially along the notch provided in the drive disc of the crankshaft 37 by virtue of the axial extending portion on L-shaped pawl 39 extending axially into the groove, or slot, provided in anti-reverse member 36. In FIG. 4, the relative rotational position of members 36 and 37 places the axial projection of L-shaped pawl 39 at the innermost portion of the cam surface, or slot, and pawl 39 is held in a retracted position out of engagement with the internally projecting lugs of gear member 42. In this mode of operation, a click spring 38 mounted on the crankshaft, provides resilient engagement with the internally projected lugs to provide an audible indication of rotation of gear 42 with respect to the crankshaft of the reel. In this mode, gear 42 rotates under the influence of the tension on the line. A drag, dependent upon the tension placed upon the drag adjusting member 44 to variably control the friction between gear 42 and the crankshaft assembly, tends to control the playing out of the line on spool 14.

FIG. 5 shows the relative positions between the anti-reverse member 36 and crankshaft member 37 when drive pawl 39 is in a radially extended position to engage one of the internally projecting lugs in gear 42 to provide a positive drive connection.

In operation, it may be seen that when the crank handle 27 is rotated in a clockwise direction, a positive, direct, mechanical connection is provided through the gear train to spooling member 17 to reel line upon spool 14. Upon reverse rotation of crank handle 27, anti-reverse member 36 tends to rotate in such reverse direction with crankshaft 37 until the action of anti-reverse spring 34 exerts a retaining force to limit reverse rotation. Thereupon relative movement between anti-reverse member 36 and crankshaft 37 takes place to withdraw drive pawl 39 radially toward the axis of rotation of the assembly to disengage it from gear 42. Gear 42 is then free to rotate upon crankshaft 37 subject to friction dependent upon the tension exerted upon drag adjustment screw 44 to variably control the friction between washer 41, gear 42 and washer 43.

It has been discovered that numerous materials exhibit desirable frictional characteristics which may be adjusted or varied in a suitable manner. For example, plastic, Teflon, or a non-ferrous metal. Further, the washer members necessary in the construction are dependent to a certain extent upon the characteristics of the material.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In apparatus of the class above described, the combination comprising:
    (a) a hollow crankshaft having a driving end and a driven end, said driven end including a radially, outwardly extending notch;
    (b) coupling means rotatably disposed on said crankshaft adjacent the driven end thereof and having an arcuate groove;
    (c) and L-shaped pawl having a radially extending portion slidably disposed in the notch in the driven end of said crankshaft and an axially extending portion slidably disposed in the arcuate groove in said coupling means;
    (d) output means rotatably disposed and in frictional engagement with the driven end of said crankshaft, said output means including an axially extending peripheral portion disposed radially, concentrically of the driven end of said crankshaft, said axially extending portion having a plurality of radially, inwardly extending lugs; and
    (e) a resiliently outwardly biased click spring member disposed on the driven end of said crankshaft so as to clickably engage the radially inwardly extending lugs on said output means upon relative rotational movement between said output means and the driven end of said crankshaft.

2. The apparatus of claim 1 in which a means for varying the frictional engagement of the output means with the driven end of the crankshaft extends through the crankshaft from the driven end thereof.

3. The apparatus of claim 1 in which the peripheral portion of the output means is in engagement with the side of the coupling means to define a chamber for enclosing the driven end of said crankshaft and said L-shaped pawl.

4. In apparatus of the class above described, the combination comprising:
    (a) a hollow crankshaft having a driving end and a driven end, said driven end including a radially, outwardly extending notch;
    (b) coupling means rotatably disposed on said crankshaft adjacent the driven end thereof and including an arcuate groove;
    (c) an L-shaped pawl member having a radially extending portion slidably disposed in the notch in the driven end of said crankshaft and an axially extending portion slidably disposed in the arcuate groove in said coupling means;
    (d) output means rotatably disposed and in frictional engagement with the driven end of said crankshaft, said output means including an axially extending peripheral portion disposed radially, concentrically of the driven end of said crankshaft, said axially extending portion having a plurality of radially, inwardly extending lugs;
    (e) a resiliently outwardly biased click spring member disposed on the driven end of the crankshaft to provide click producing engagement with the lugs on the output means upon relative rotation between said output means and the driven end of the crankshaft; and
    (f) a torsion spring mounted on the outside periphery of said coupling means, said torsion spring having one end stationarily disposed in proximity to said coupling means and being operative to permit rotational motion of said coupling means in only one direction.

(References on following page)

References Cited by the Examiner

UNITED STATES PATENTS

| | | | |
|---|---|---|---|
| 850,580 | 4/1907 | Holzmann | 242—84.54 |
| 929,867 | 8/1909 | Meisselbach et al. | 242—84.54 |
| 1,445,525 | 2/1923 | McKimmy | 242—84.54 |
| 1,588,873 | 6/1926 | Catucci | 242—84.54 |
| 1,836,755 | 12/1931 | Hirsch | 242—84.44 |
| 2,613,883 | 10/1952 | Limpright | 242—84.54 |
| 2,686,016 | 8/1954 | Killian | 242—84.54 X |
| 2,760,357 | 8/1956 | Burns | 242—84.54 X |
| 2,896,874 | 7/1959 | Nurmse | 242—84.45 |
| 2,903,202 | 9/1959 | Sarah | 242—84.2 |
| 3,025,020 | 3/1962 | Sarah | 242—84.45 |
| 3,059,872 | 10/1962 | Griffis | 242—84.54 X |

MERVIN STEIN, *Primary Examiner.*

RUSSELL C. MADER, *Examiner.*